United States Patent
Hsu et al.

(10) Patent No.: US 8,164,023 B2
(45) Date of Patent: Apr. 24, 2012

(54) METHOD FOR MAKING BACKLIGHT MODULE FRAME

(75) Inventors: Tung-Ming Hsu, Taipei Hsien (TW);
Chien-Min Chen, Taipei Hsien (TW);
Ming-Fu Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 807 days.

(21) Appl. No.: 12/251,391

(22) Filed: Oct. 14, 2008

(65) Prior Publication Data

US 2009/0236405 A1 Sep. 24, 2009

(30) Foreign Application Priority Data

Mar. 24, 2008 (CN) .......................... 2008 1 0300680

(51) Int. Cl.
*B23K 26/00* (2006.01)
(52) U.S. Cl. .......... 219/121.64; 219/121.63; 219/121.85
(58) Field of Classification Search ............. 219/121.64, 219/121.63, 121.85; 349/58
See application file for complete search history.

(56) References Cited

U.S. PATENT DOCUMENTS

| | | | | |
|---|---|---|---|---|
| 5,239,157 A | * | 8/1993 | Sakano et al. | 219/121.64 |
| 7,178,968 B2 | * | 2/2007 | Sugahara et al. | 362/633 |
| 7,369,189 B2 | * | 5/2008 | Chieh | 349/58 |

FOREIGN PATENT DOCUMENTS

| | | | |
|---|---|---|---|
| EP | 305352 | | 3/1989 |
| JP | 2001249619 A | * | 9/2001 |
| TW | 200520667 A | | 6/2005 |
| TW | I252727 | | 4/2006 |
| TW | 200720748 A | | 6/2007 |

\* cited by examiner

*Primary Examiner* — M. Alexandra Elve
(74) *Attorney, Agent, or Firm* — Altis Law Group, Inc.

(57) ABSTRACT

An exemplary method for making backlight module frame includes: providing a plurality of metallic sheets cooperatively defining a frame shape, and a positioning device comprising a worktable and a plurality of positioning portions defined at corners of the worktable, wherein each metallic sheet comprises a first positioning protrusion corresponding to the positioning portions, positioning the metallic sheets on the worktable of the positioning device with the first positioning protrusions of the metallic sheets engaging with the positioning portions of the positioning device, welding the metallic sheets together to form a semi-manufactured frame, and pressing the semi-manufactured frame to form a backlight module frame.

20 Claims, 5 Drawing Sheets

METHOD FOR MAKING BACKLIGHT MODULE FRAME

BACKGROUND

1. Technical Field

The present disclosure relates to a method for making a backlight module frame for a liquid crystal display (LCD) device.

2. Description of the Related Art

A typical LCD device includes an LCD panel, and a backlight module mounted under the LCD panel for supplying light thereto. The backlight module generally includes a light source, a light guide plate, and a frame. The light guide plate is made of a transparent acrylic plastic, and used for guiding light received from the light source to uniformly illuminate the liquid crystal display panel. The frame is usually made of a metal, and used for providing a high mechanical strength to protect the light guide plate and the light source. The frame also provides an electromagnetic shield capability.

A typical method of making a backlight module frame includes providing a number of individual starting components that are cut to proper length, pressing the starting components to form a unit corresponding to the subsequent unit form of the frame, assembling the units to form a semi-manufactured frame corresponding to the subsequent form of the frame, and welding the semi-manufactured frame to manufacture a backlight module frame.

Referring to FIG. 5, two typical L-shaped metallic sheets 10 are assembled to form a rectangular shape with the help of two positioning plates 21 of a typical positioning device 20. The positioning plates 21 can adjust the positions of the two typical L-shaped metallic sheets 10 at two sides of a worktable (not shown) of the typical positioning device 20. However, positioning the typical two L-shaped metallic sheets 10 is manually performed. Therefore, the process of making the backlight module frame is time consuming, which is problematic for mass-producing the backlight module frames.

What is needed, therefore, is a new method for making backlight module frames that overcomes the above mentioned disadvantages.

SUMMARY

The present disclosure provides a method for making a backlight module frame. The method includes: providing a plurality of metallic sheets cooperatively defining a frame shape, and a positioning device comprising a worktable and a plurality of positioning portions defined at corners of the worktable, wherein each metallic sheet comprises a first positioning protrusion corresponding to the positioning portions, positioning the metallic sheets on the worktable of the positioning device with the first positioning protrusions of the metallic sheets engaging with the positioning portions of the positioning device, welding the metallic sheets together to form a semi-manufactured frame, and pressing the semi-manufactured frame to form a backlight module frame.

Other advantages and novel features will become more apparent from the following detailed description of preferred embodiments when taken in conjunction with the accompanying drawings.

BRIEF DESCRIPTION OF THE DRAWINGS

Many aspects of the method for making a backlight module frame can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION OF THE PREFERRED EMBODIMENTS

Figure 1:
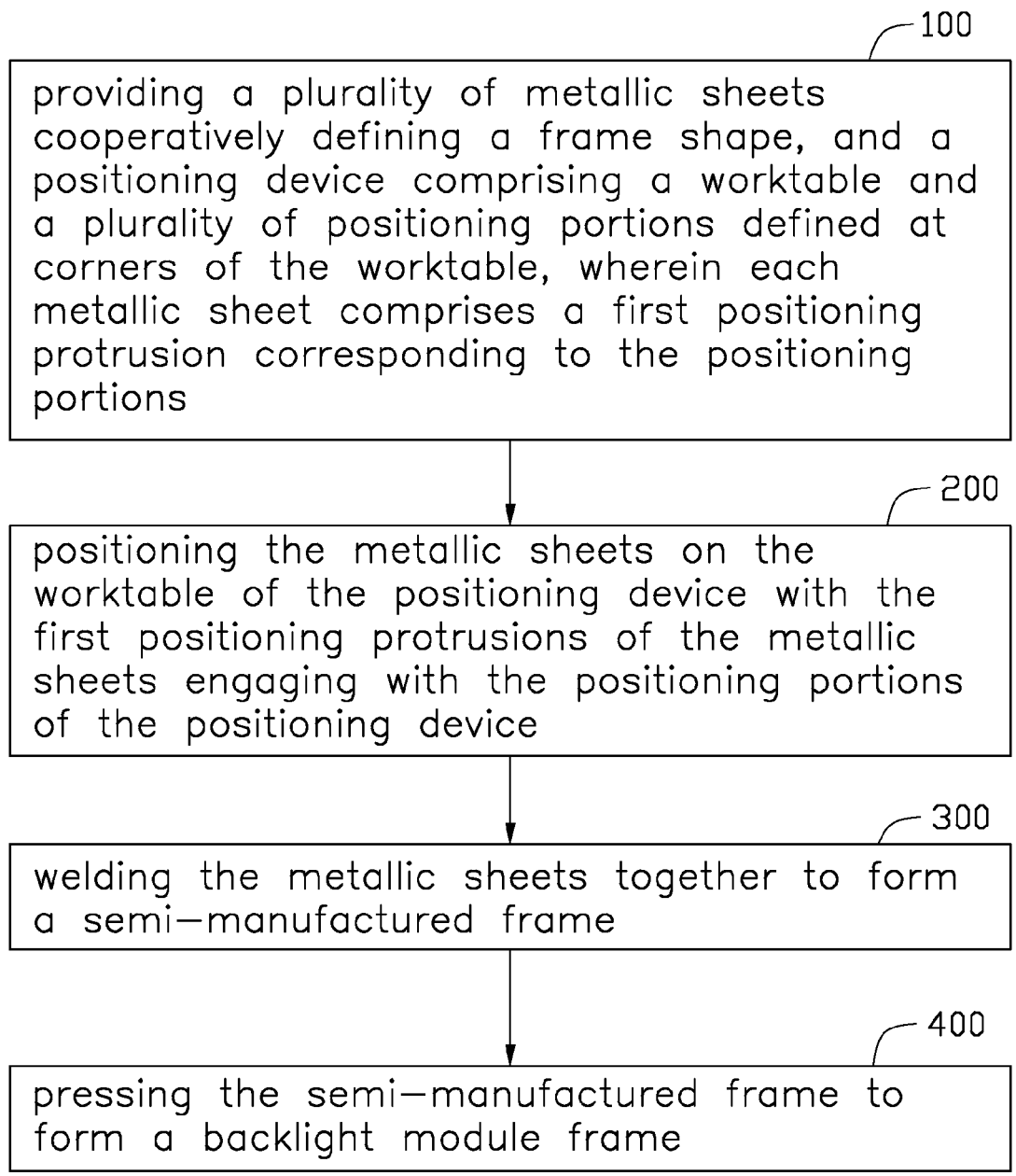
FIG. 1 is a flowchart of an embodiment of a method for making a backlight module frame.
Figure 2:
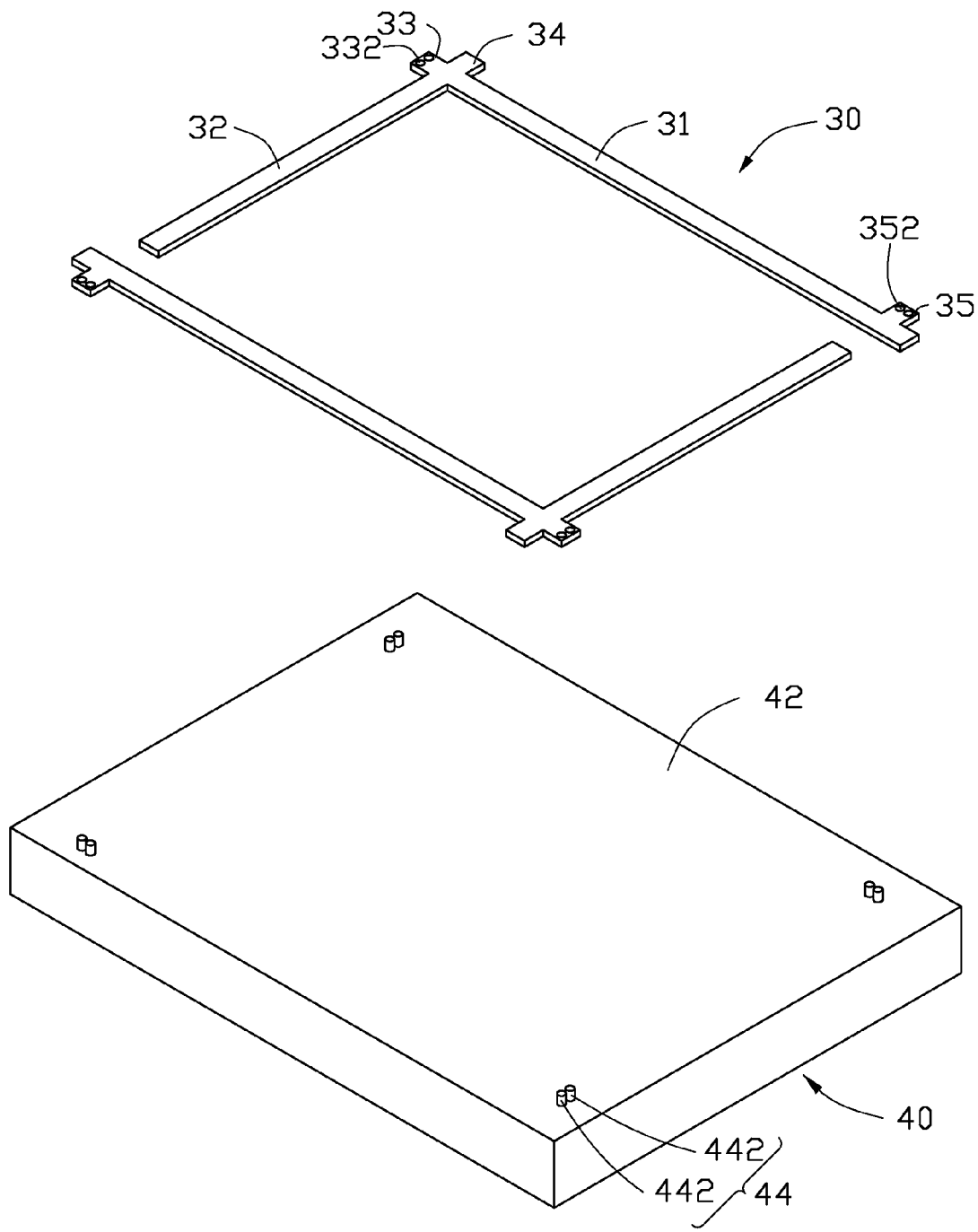
FIG. 2 is a schematic, exploded, isometric view of two metallic sheets, and a first embodiment of a positioning device.

FIG. 1 is a flowchart of a first embodiment of a method for making a backlight module frame. Depending on the embodiment, certain of the steps described below may be removed, others may be added, and the sequence of steps may be altered. Referring to FIGS. 1 and 2, the method includes the following:

Step 100: providing two metallic sheets 30 and a positioning device 40, the two metallic sheets 30 cooperatively defining a frame shape, wherein the positioning device 40 comprises a worktable 42 and at least two positioning portions 44 defined at corners of the worktable 42, and each of the two metallic sheets 30 further defines a positioning protrusion 33 or 35 corresponding to the positioning portions 44;

Step 200: positioning the two metallic sheets 30 in contact with each other on the worktable 42 of the positioning device 40 at/via the positioning protrusions 44 of the two metallic sheets 30 assembled with the positioning portions 44 of the positioning device 40;

Step 300: welding the two metallic sheets 30 to form a semi-manufactured frame corresponding to a subsequent backlight module frame; and Step 400: pressing the semi-manufactured frame to form a backlight module frame.

In step 100, the positioning device 40 includes a worktable 42 and four positioning portions 44 defined at corners of the worktable 42. The metallic sheet 30 is an L-shaped sheet, which includes a first side portion 31 and a second side portion 32. The metallic sheet 30 further includes a first positioning protrusion 33, a second positioning protrusion 34, and a third positioning protrusion 35. Each of the first and second positioning protrusions 33 and 34 extend out from an intersection of the second and first side portions 32, 31. The third positioning protrusion 35 extends out from a portion of the first side portion 31 adjacent to an end of the first side portion 31. In this embodiment, the two metallic sheets 30 are the same. The two metallic sheets 30 cooperatively define a frame shape. The metallic sheets 30 may be produced with single pieces punched from a metal sheet. Each positioning portion 44 includes two positioning pins 442. The first positioning protrusion 33 defines two through holes 332 corresponding to the two positioning pins 442 of a first of the positioning portion 44, and the third positioning protrusion 35 defines two through holes 352 corresponding to the two positioning pins 442 of a second of the positioning portion 44.

In an alternative embodiment, the second positioning protrusion 34 can be omitted, or each of the first and third positioning protrusion 33 and 35 defines only one through hole 332, or 352 and one positioning pin 442 for each positioning portion 44.

In step 200, the two metallic sheets 30 are positioned on the worktable 42 such that the positioning pins 442 are inserted into the through holes 332, 352 of the two metallic sheets 30.

In step 300, when the two metallic sheets 30 are assembled together, the two metallic sheets 30 are welded by a welding apparatus (not shown) to form a semi-manufactured frame (not shown) of the subsequent backlight module frame.

The welding apparatus may be selected from a group consisting of a $CO_2$ high performance laser and an Nd-YAG laser. The welding apparatus may have a control interface that allows external programming and setting the laser power cycles, pulse programs, pulse frequency, and laser power. In an analog laser power control that is controlled directly by a computerized numerical control, one has the ability to control the laser power's path-dependency, rate-dependency, time-dependency or laser power levels. When utilizing the laser beam to weld the metallic sheets together, heated areas adjacent to the edges of the starting components are small, thus, resulting individual weld seams produced by the laser beam are significantly small. In addition, the size of the semi-manufactured frame may not be affected in a significant way due to the laser welding process. Furthermore, the semi-manufactured frame will have a smooth surface without producing any protruding weld seams thereon due to the laser welding process.

The semi-manufactured frame has smooth surfaces and enough mechanical strength to undergo a pressing process. Before welding, welding surfaces of the two metallic sheets 30 should be polished thoroughly. Polishing allows the two metallic sheets 30 to connect tightly and increase the laser welding effectiveness.

In step 400, the semi-manufactured frame may be pressed by a pressing machine to form a backlight module frame according to a backlight frame design. The positioning protrusions 33, 34, 35 can be punched out from the backlight module frame and be a part of the backlight module frame according to a predetermined design.

Figure 3:
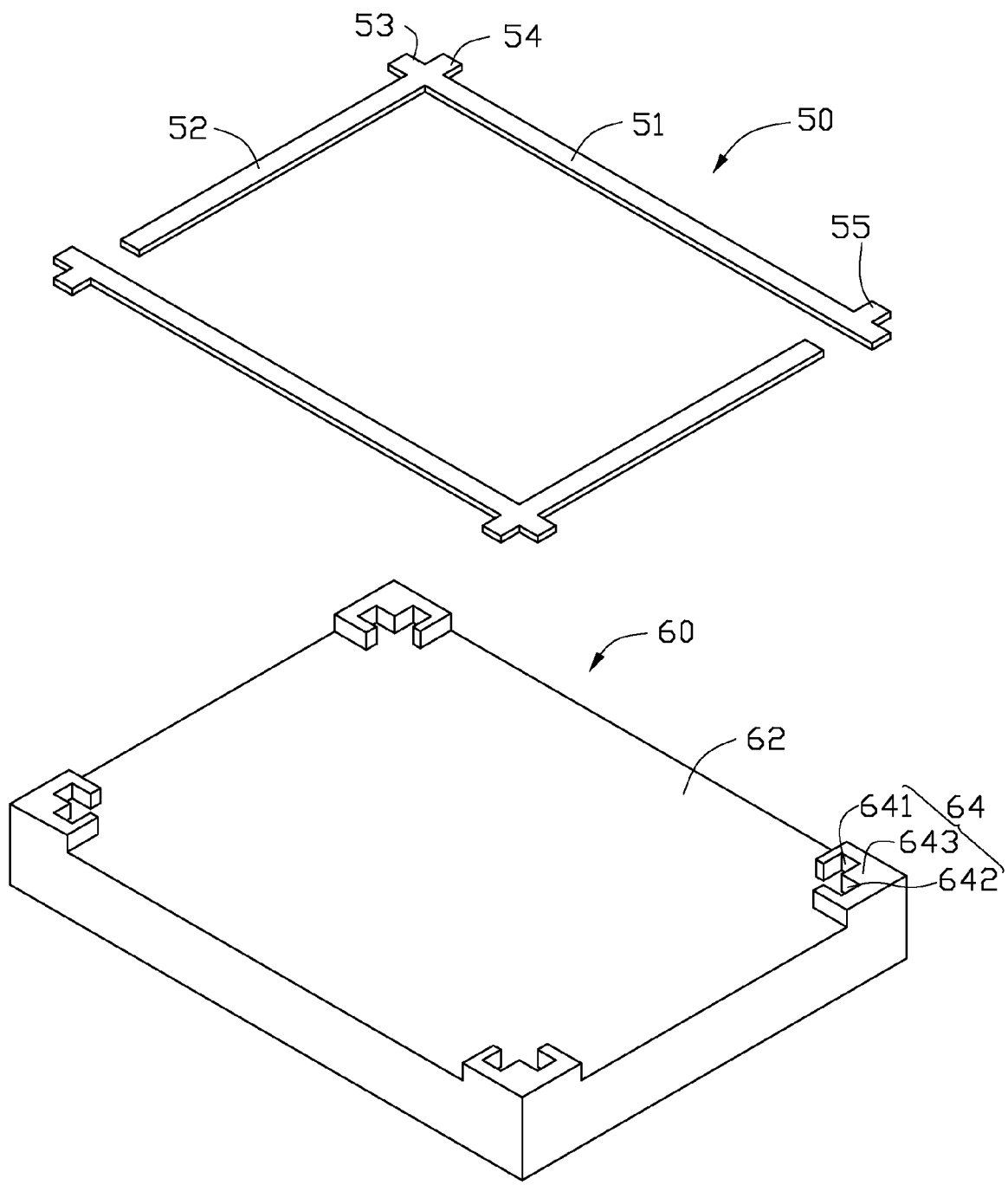
FIG. 3 is a schematic, exploded, isometric view of two metallic sheets, and a second embodiment of a positioning device.

Referring to FIG. 3, a second embodiment of a method for making a backlight module frame is similar to the method of the first embodiment, except that the metallic sheets 50 and a positioning device 60 are different. The metallic sheet 50 is an L-shaped sheet, which includes a first side portion 51 and a second side portion 52. The metallic sheet 50 further includes a first positioning protrusion 53, a second positioning protrusion 54, and a third positioning protrusion 55. The metallic sheet 50 is similar to the metallic sheet 30 except the metallic sheet 50 does not include a plurality of through holes. The positioning device 60 includes a worktable 62 and four positioning portions 64. The positioning device 60 is similar to the positioning device 40 except that the positioning portions 64 is different from the positioning portions 44. Each of the positioning portions 64 includes a positioning protruding member 643 protruding out from the worktable 62. A first cutout 641 and a second cutout 642 are defined in each positioning protruding member 643. The second cutout 642 communicates with the first cutout 641. The first and second cutout 641, 642 are configured for receiving the positioning protrusions 53, 55 of the two metallic sheet 50.

When positioning the two metallic sheets 50 to the worktable 62 of the positioning device 60, the positioning protrusions 53, 55 of the metallic sheets 50 are easily positioned to the first cutout 641 and the second cutout 642 of the positioning protruding member 643 of the worktable 62.

Figure 4:
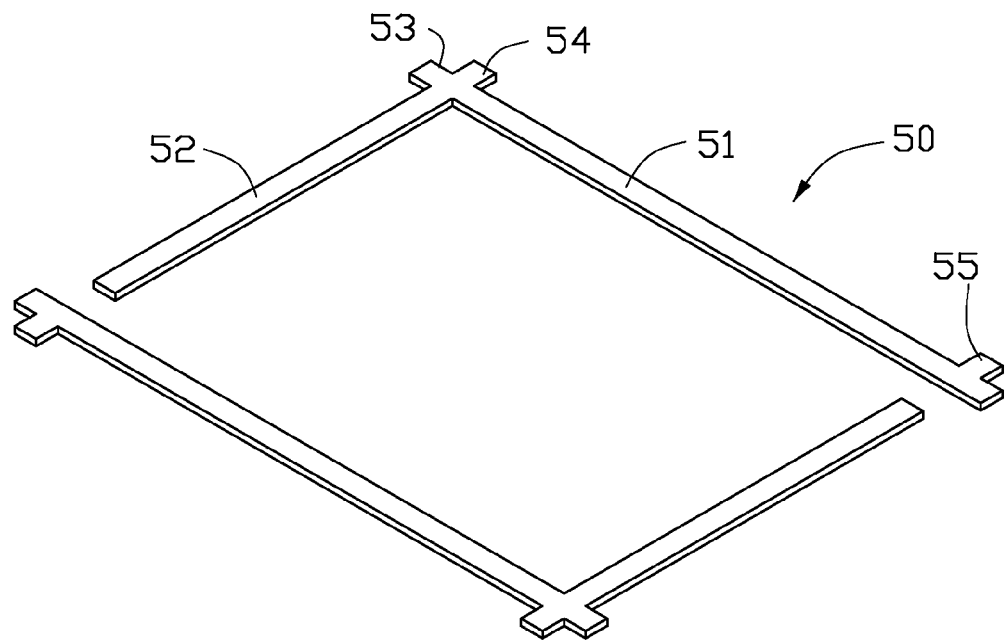
FIG. 4 is a schematic, exploded, isometric view of two metallic sheets, and a third embodiment of a positioning device.
Figure 4:
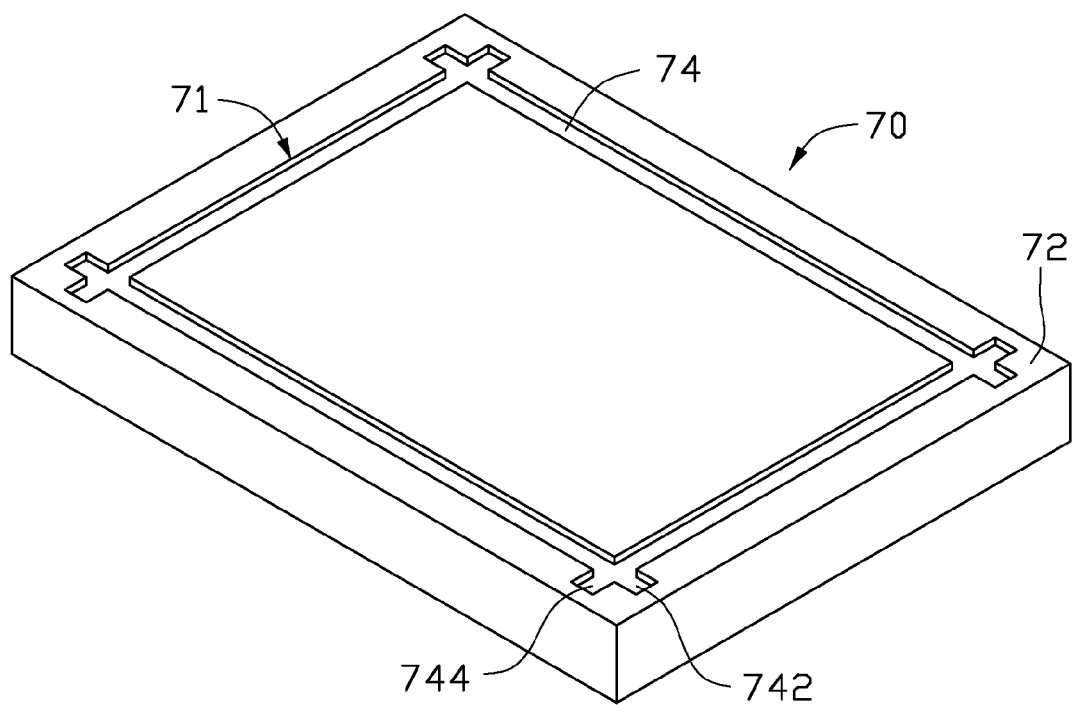
Figure 5:
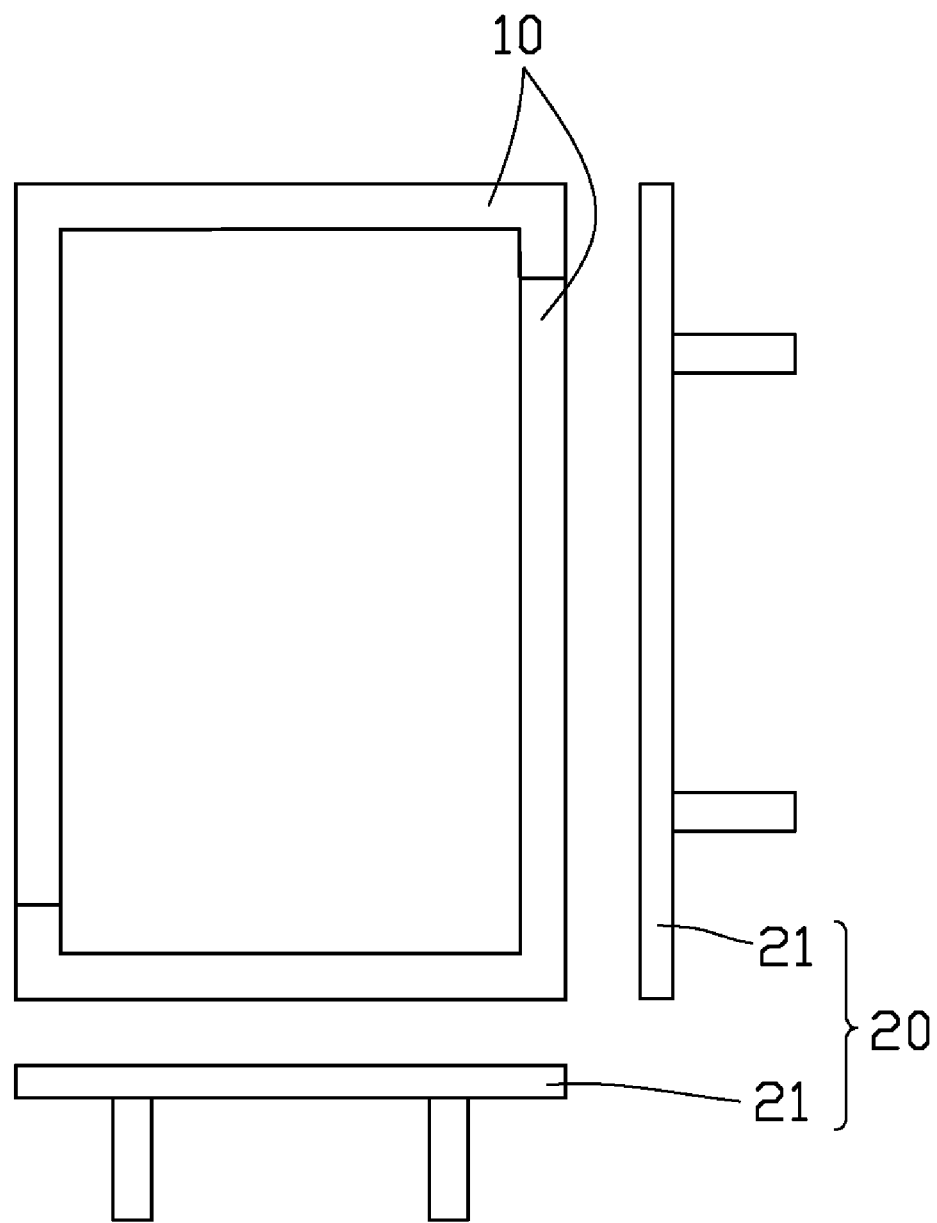
FIG. 5 is a schematic, top plan view of two typical metallic sheets and a typical positioning device.

Referring to FIG. 4, a third embodiment of a method for making a backlight module frame is similar to the method of the first embodiment, except that the metallic sheets 50 and a positioning device 70 are different. The positioning device 70 includes a worktable 72 and a rectangular ring depression 74 for receiving the metallic sheet 50. The positioning device 70 further includes two positioning grooves 742, 744 adjacent each corners according to the positioning protrusions 53, 55 of the two metallic sheets 50. The positioning protrusions 53, 55 of the metallic sheets 50 can be easily assembled in contact with each other by positioning the positioning protrusions 53, 55 to the two positioning grooves 742, 744 of the rectangular ring depression 74 of the positioning device 70.

This method includes providing the two metallic sheets 50 and the positioning device 70, positioning the two metallic sheets 50 in contact with each other in ring depression 74, welding the two metallic sheets 50 to form a semi-manufactured frame, and pressing the semi-manufactured frame to form a backlight module frame.

It should be pointed out that more than two metallic sheets may be welded to form the backlight module frame in the disclosure.

Finally, while the present disclosure has been described with reference to particular embodiments, the description is illustrative of the disclosure and is not to be construed as limiting the disclosure. Therefore, various modifications can be made to the embodiments by those skilled in the art without departing from the true spirit and scope of the disclosure as defined by the appended claims.

What is claimed is:

1. A method for making a backlight module frame, the method comprising:

providing a plurality of metallic sheets cooperatively defining a frame shape, and a positioning device comprising a worktable and a plurality of positioning portions defined at corners of the worktable, wherein each metallic sheet comprises a first positioning protrusion corresponding to the positioning portions;

positioning the metallic sheets on the worktable of the positioning device with the first positioning protrusions of the metallic sheets engaging with the positioning portions of the positioning device;

welding the metallic sheets together to form a semi-manufactured frame; and pressing the semi-manufactured frame to form a backlight module frame.

2. The method of claim 1, wherein each metallic sheet is an L-shaped sheet comprising a first side portion and a second side portion; the metallic sheet further comprises a second positioning protrusion; the first positioning protrusion extends out from an intersection of the first side portion and the second side portion; and the second positioning protrusion extends out from an end of one of the first and second side portions.

3. The method of claim 2, wherein the plurality of positioning portions comprises four positioning portions defined at corners of the worktable, each positioning portion comprises a positioning pin, and each of the first and second positioning protrusions defines a through hole therein corresponding to a respective one of the positioning pins.

4. The method of claim 2, wherein the plurality of positioning portions comprises four positioning portions at corners of the worktable; each positioning portion comprises a positioning protruding member protruding out from the worktable; each positioning protruding member defines a cutout therein; and the cutouts are configured to receive the first and second positioning protrusions of the metallic sheets.

5. The method of claim 1, wherein the metallic sheets are produced from single pieces punched from a metal sheet.

6. The method of claim 1, wherein the welding step uses a laser selected from the group consisting of a $CO_2$ gas laser and an Nd:YAG solid-state laser.

7. A method for making a backlight module frame, the method comprising:
providing a plurality of metallic sheets cooperatively defining a frame shape, and a positioning device, wherein each metallic sheet comprises at least one positioning protrusion extending from an end thereof; and a ring depression is defined in the positioning device for receiving the metallic sheets;
positioning the metallic sheets in contact with each other in the ring depression of the positioning device;
welding the metallic sheets to form a semi-manufactured frame; and
pressing the semi-manufactured frame to form a backlight module frame.

8. The method of claim 7, wherein each metallic sheet is an L-shaped sheet comprising a first side portion and a second side portion, and the at least one positioning protrusion comprises a first positioning protrusion, a second positioning protrusion, and a third positioning protrusion, each of the first and second positioning protrusions extending out from an intersection of the first and second side portions, and the third positioning protrusion extending out from an end of one of the first and the second side portions.

9. The method of claim 8, wherein the plurality of metallic sheets comprises two metallic sheets.

10. The method of claim 7, further comprising polishing welding surfaces of the metallic sheets before welding the metallic sheets.

11. The method of claim 7, further comprising, after pressing the semi-manufactured frame to form the backlight module frame, punching positioning protrusions out from the backlight module frame, wherein the positioning protrusions are a part of the backlight module frame after such punching.

12. The method of claim 1, further comprising polishing welding surfaces of the metallic sheets before welding the metallic sheets together.

13. The method of claim 12, further comprising, after pressing the semi-manufactured frame to form the backlight module frame, punching positioning protrusions out from the backlight module frame, wherein the positioning protrusions are a part of the backlight module frame after such punching.

14. A method for making a backlight module frame, the method comprising:
providing two metallic sheets cooperatively defining a frame shape, and a positioning device comprising a worktable and four positioning portions defined at four corners of the worktable, wherein each metallic sheet comprises at least one positioning protrusion, and each of the at least one positioning protrusion corresponds to a respective one of the four positioning portions;
positioning the metallic sheets on the worktable of the positioning device with the positioning protrusions of the metallic sheets engaging with the corresponding positioning portions of the positioning device;
welding the metallic sheets together to form a semi-manufactured frame; and
pressing the semi-manufactured frame to form a backlight module frame.

15. The method of claim 14, wherein each of the two metallic sheets is an L-shaped sheet comprising a first side portion and a second side portion, and the at least one positioning protrusion comprises a first positioning protrusion, a second positioning protrusion, and a third positioning protrusion, each of the first and second positioning protrusions extending out from an intersection of the second and first side portions, and the third positioning protrusion extending out from an end of one of the first and the second side portions.

16. The method of claim 15, wherein each of the four positioning portions comprises at least one positioning pin, one of the first and second positioning protrusions of each metallic sheet defines at least one through hole therein, and the third positioning protrusion of the metallic sheet defines at least one through hole therein, and each of the at least one through hole corresponds to the at least one positioning pin of a respective one of the four positioning portions.

17. The method of claim 16, wherein the at least one positioning pin comprises two positioning pins, the at least one through hole of one of the first and second positioning protrusions of each metallic sheet comprises two through holes, and the at least one through hole of the third positioning protrusion of the metallic sheet comprises two through holes.

18. The method of claim 15, wherein each of the four positioning portions comprises a positioning protruding member protruding out from the worktable, the positioning protruding member defines a cutout therein, and the cutouts of the four positioning portions are configured to receive the first, second, and third positioning protrusions of the two metallic sheets.

19. The method of claim 14, further comprising polishing welding surfaces of the metallic sheets before welding the metallic sheets together.

20. The method of claim 19, further comprising, after pressing the semi-manufactured frame to form the backlight module frame, punching positioning protrusions out from the backlight module frame, wherein the positioning protrusions are a part of the backlight module frame after such punching.

* * * * *